United States Patent
Schenk et al.

(10) Patent No.: US 11,639,765 B2
(45) Date of Patent: May 2, 2023

(54) FLUID DUCT ARRANGEMENT AND CONNECTORS FOR A FLUID DUCT

(71) Applicant: MANN+HUMMEL GmbH, Ludswigsburg (DE)

(72) Inventors: Herbert Schenk, Benningen (DE); Dagmar Ruder, Markgroeningen (DE); Deijang Yang, Changchun (CN)

(73) Assignee: MANN+HUMMEL GmbH, Ludwigsburg (DE)

( * ) Notice: Subject to any disclaimer, the term of this patent is extended or adjusted under 35 U.S.C. 154(b) by 7 days.

(21) Appl. No.: 16/887,953

(22) Filed: May 29, 2020

(65) Prior Publication Data
US 2020/0292117 A1     Sep. 17, 2020

Related U.S. Application Data

(63) Continuation of application No. PCT/CN2017/114245, filed on Dec. 1, 2017.

(51) Int. Cl.
*F16L 37/12* (2006.01)
*F16L 21/08* (2006.01)

(52) U.S. Cl.
CPC .............. *F16L 37/12* (2013.01); *F16L 21/08* (2013.01)

(58) Field of Classification Search
CPC . F16L 21/08; F16L 37/12; F16L 37/26; F16L 37/084; F16L 37/0841
USPC ..................................... 285/18, 67, 325, 326
See application file for complete search history.

(56) References Cited

U.S. PATENT DOCUMENTS

| 5,383,691 A | 1/1995 | Anthony |
| 9,295,825 B2 | 3/2016 | Biddell et al. |
| 2010/0019492 A1 | 1/2010 | Richards |
| 2011/0049871 A1* | 3/2011 | Miller ...................... F16L 37/26 285/330 |
| 2012/0298063 A1 | 11/2012 | Schiesz |
| 2016/0208966 A1 | 7/2016 | Eilert et al. |

FOREIGN PATENT DOCUMENTS

| CN | 102383894 A | 3/2012 |
| EP | 2083205 A2 | 7/2009 |
| EP | 2360410 A1 | 8/2011 |
| EP | 2827036 A1 | 1/2015 |
| FR | 2563317 A1 | 10/1985 |

* cited by examiner

*Primary Examiner* — Aaron M Dunwoody

(57) ABSTRACT

A connector arrangement (100) for connecting a first tube (102) and a second tube (104) in a detachable manner has a first connector (110) and a second connector (130), wherein both connectors (110, 130) have a closed circumference. For establishing a connection between the first and second connectors (110, 130) an internal surface of a first circumferential portion (115) of the first connector (110) is arranged on an external surface of a first circumferential portion (135) of the second connector (130) and an external surface of a second circumferential portion (118) of the first connector (110) is arranged on an internal surface of a second circumferential portion (138) of the second connector (130). An air duct having such a connector arrangement (100) and connectors for such a connector arrangement (100) is disclosed.

15 Claims, 6 Drawing Sheets

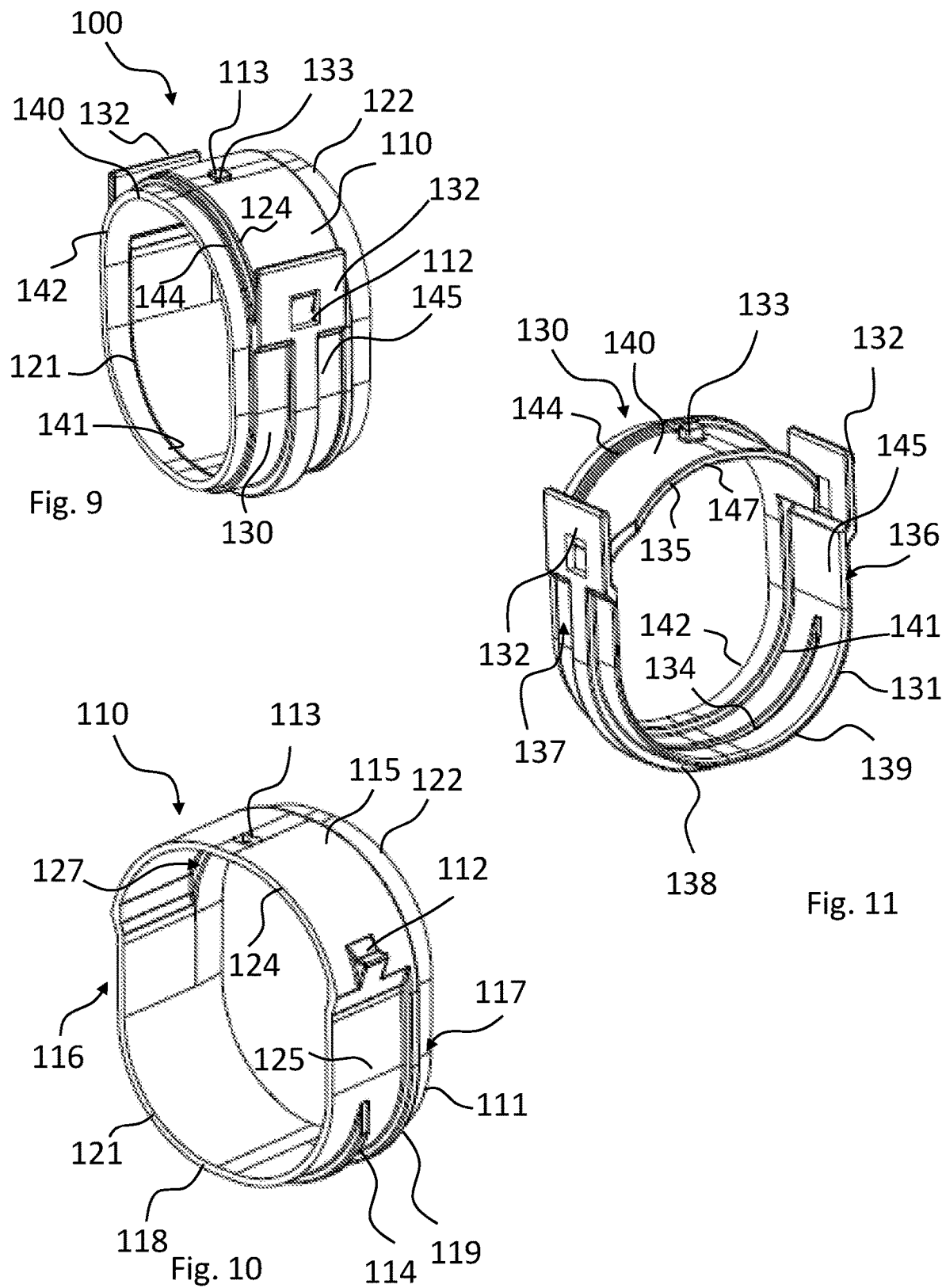

FLUID DUCT ARRANGEMENT AND CONNECTORS FOR A FLUID DUCT

CROSS-REFERENCE TO RELATED APPLICATION

This application is a bypass continuation application of international application No. PCT/CN2017/114245 having an international filing date of 1 Dec. 2017 and designating the United States. The entire contents of the aforesaid international application is incorporated herein by reference to the fullest extent permitted by the law.

TECHNICAL FIELD

The invention relates to a fluid duct arrangement, connectors of a fluid duct arrangement, in particular a charge air duct for a turbocharged internal combustion engine.

PRIOR ART

In EP 1674679 A2 a combustion engine is described which has a ventilation system with a tube being connected to an air duct of a fresh air system by way of a connecting piece. At its interface to the connecting piece the tube is provided with openings which cooperate with corresponding hooks arranged at the connecting piece, thus providing a cost efficient connection arrangement between tube and air duct.

SUMMARY OF THE INVENTION

It is an object of the invention to provide a connector arrangement which can provide a detachable and rigid connection.

Another object of the invention is to provide connectors for such a connector arrangement.

Another object of the invention is to provide an air duct comprising such a connector arrangement, in particular an air duct for a turbocharged internal combustion engine exhibiting improved efficiency of the internal air flow.

An object is achieved according to one aspect of the invention by a connector arrangement for connecting a first tube and a second tube in a detachable manner, comprising a first connector and a second connector, wherein both connectors have a closed circumference, wherein for establishing a connection between the first and second connectors an internal surface of a first portion of the first connector is arranged on an external surface of a first portion of the second connector and an internal surface of a second portion of the first connector is arranged on an external surface of a second portion of the second connector.

Another object of the invention is achieved by an air duct comprising such a connector arrangement where a first tube and a second tube are connected in a detachable manner, the connector arrangement comprising a first connector and a second connector, wherein both connectors have a closed circumference, wherein for establishing a connection between the first and second connectors an internal surface of a first portion of the first connector is arranged on an external surface of a first portion of the second connector and an external surface of a second portion of the first connector is arranged on an internal surface of a second portion of the second connector.

Another object of the invention is achieved by a connector for such a connector arrangement.

The other claims, the description and the drawings describe advantageous embodiments of the invention.

According to a first aspect of the invention, a connector arrangement is proposed for connecting a first tube and a second tube of a fluid duct in a detachable manner. The connector arrangement comprises a first connector and a second connector, wherein both connectors have a closed circumference. For establishing a connection between the first and second connectors an internal surface of a first circumferential portion of the first connector is arranged on an external surface of a first circumferential portion of the second connector and an external surface of a second circumferential portion of the first connector is arranged on an internal surface of a second circumferential portion of the second connector.

Advantageously, the connection between the two connectors can be established by moving the connectors in a direction cross to a longitudinal axis of the connectors. A robust and strong connection between the connectors can be achieved which can be easily disassembled. The connector arrangement is particularly useful for rigid connections between tubes which need not to be completely fluid tight. Preferably, the connectors may comprise elements for locking the connection after the connector arrangement has been established. Other than in prior art connector arrangements which are joint together and snap locked at the same time, joint and locking functions of the inventive connector arrangement can be separated from each other. Thus, the connection provides large connection surfaces which allows for strong pulling forces during operation of the fluid duct. Failure of the connection due to vibrations or pulling forces acting on the connection can be reduced. At the same time, the connector arrangement can be easily disassembled.

Further, a robust and rigid connection arrangement can be provided where the interface of the connection is completely surrounded by the connectors. In particular, the inner surfaces of the connectors are flush when put in place so that a fluid flow inside the connector arrangement is not disturbed by steps, edges or the like in the connector arrangement.

According to an advantageous embodiment, the first and second connectors may comprise one or more elements of a locking mechanism for locking the established connection of the first and second connectors. In particular, the connectors may comprise one or more elements of a catch mechanism. Preferably, the elements may comprise one or more clips and one or more corresponding notches. A clip which is arranged at an exterior surface of the connector arrangement can be easily removed from and attached to a notch for disassembling or establishing the connection between the two connectors. The clip and the corresponding notch may be used to close the connection arrangement after the two connectors are put together.

Preferably, the connectors may be made of plastic material such as polypropylene, polyamide or the like. In particular, the connector comprising the clip may be manufactured by injection molding, the connector providing the corresponding notch may be manufactured by injection molding or by blow molding.

According to an advantageous embodiment, the first and second circumferential portions of the first connector and/or the first and second circumferential portions of the second connector may comprise one or more mutually form fitting elements for locking the first and second connectors in an axial direction. For instance, an opening and a corresponding pin may be provided at the first and second connectors, respectively. Advantageously, the opening and the corresponding pin may be arranged so that when moving the connectors towards each other the opening overlaps the pin and, when the forward movement continues, engages the pin. For instance, a protrusion in circumferential direction arranged at an exterior surface of one of the connectors may cooperate with a corresponding groove at an interior surface of the other one of the connectors. This ensures a large resistance against high pulling forces without impeding the function of locking elements for locking the connection arrangement such as a clip-and-notch combination for closing the connection arrangement.

According to an advantageous embodiment, the interior surfaces of the first and second connectors may comprise one or more steps which cooperate with one or more corresponding edges and/or end faces for locking the first and second connectors in axial direction. A robust connection arrangement resistant against high pulling forces is achieved.

According to an advantageous embodiment, at least one of the first and second connectors may comprise a guiding portion for mutually guiding the first and second connectors in a direction generally perpendicular to the axial direction when establishing the connection. For instance, the cross section of the connectors may by oval-like. Advantageously, putting the connectors together crosswise to their longitudinal axis is facilitated. In other embodiments, the cross section may be rectangular or circular, if desired.

According to an advantageous embodiment, the second connector may comprise a segment with a closed circumference and a segment having a gap in its circumference. Preferably, the segment having a gap in its circumference abuts the segment with a closed circumference in axial direction. Advantageously, the first connector may be inserted into the second connector through the circumferential gap of the second connector.

According to an advantageous embodiment, one or both of the connectors may be integrally formed with a tube. Alternatively, according to an advantageous embodiment, one or both of the connectors may be attached to a tube. Connector and tube may be connected by clamping, glueing, friction welding, butt welding with heat reflectors and the like.

According to another aspect of the invention, an air duct is proposed comprising a connector arrangement, connecting a first tube and a second tube of the air duct. The connector arrangement comprises a first connector and a second connector, wherein both connectors have a closed circumference. For establishing a connection between the first and second connectors an internal surface of a first circumferential portion of the first connector is arranged on an external surface of a first circumferential portion of the second connector and an external surface of a second circumferential portion of the first connector is arranged on an internal surface of a second circumferential portion of the second connector.

Advantageously, a robust and rigid connection arrangement can be provided where the interface of the connection is completely surrounded by the connectors.

According to another aspect of the invention, a connector for a connector arrangement is proposed for connecting a first tube and a second tube, comprising a body displaying one or more openings in a first circumferential portion and one or more protrusions arranged at a circumferential portion of the body opposite the first circumferential portion. The openings may cooperate with corresponding pins arranged at another connector in a connection arrangement. The protrusions may cooperate with corresponding grooves arranged at another connector in a connection arrangement. A robust and rigid connection arrangement can be provided where the interface of the connection is completely surrounded by the connectors and the joint and locking functions of the inventive connector arrangement can be separated from each other.

According to an advantageous embodiment, one or more steps may be provided at an interior surface of the body of the connector. The steps may cooperate with corresponding edges or front faces arranged at another connector in a connection arrangement. This allows to secure the connector in a connection arrangement in longitudinal direction.

According to an advantageous embodiment, one or more notches may be provided at an external surface of the body. The notches may cooperate with corresponding clips arranged at another connector in a connection arrangement. This allows to secure the connector in a connection arrangement in longitudinal direction providing a connection which is resistant against high pulling forces.

According to another aspect of the invention, a connector for a connector arrangement is proposed for connecting a first tube and a second tube, comprising a body displaying one or more pins in a first circumferential portion and one or more circumferential grooves arranged in a circumferential portion of the body opposite the first circumferential portion.

The pins may cooperate with corresponding openings arranged at another connector in a connection arrangement. The grooves may cooperate with corresponding protrusions arranged at another connector in a connection arrangement. A robust and rigid connection arrangement can be provided where the interface of the connection is completely surrounded by the connectors and the joint and locking functions of the inventive connector arrangement can be separated from each other.

According to an advantageous embodiment, one or more steps may be provided at an interior surface of the body projecting to an interior of the body. The steps may cooperate with corresponding edges or front faces arranged at another connector in a connection arrangement. This allows to secure the connector in a connection arrangement in longitudinal direction.

According to an advantageous embodiment, one or more clips may be provided at an external surface of the body. The clips may cooperate with corresponding notches arranged at another connector in a connection arrangement. This allows to secure the connector in a connection arrangement in longitudinal direction providing a connection which is resistant against high pulling forces.

BRIEF DESCRIPTION OF THE DRAWINGS

The present invention together with the above-mentioned and other objects and advantages may best be understood from the following detailed description of the embodiments, but not restricted to the embodiments, wherein is shown in:

FIG. 9 an isometric view of a connection arrangement comprising a first and second connector according to another embodiment of the invention where the first connector is manufactured by injection molding and the second connector is manufactured by blow molding;

FIG. 10 an isometric view of the first connector of the connection arrangement shown in FIG. 9;

FIG. 11 an isometric view of the second connector of the connection arrangement shown in FIG. 9;

DETAILED DESCRIPTION OF THE DRAWINGS

Figure 1:
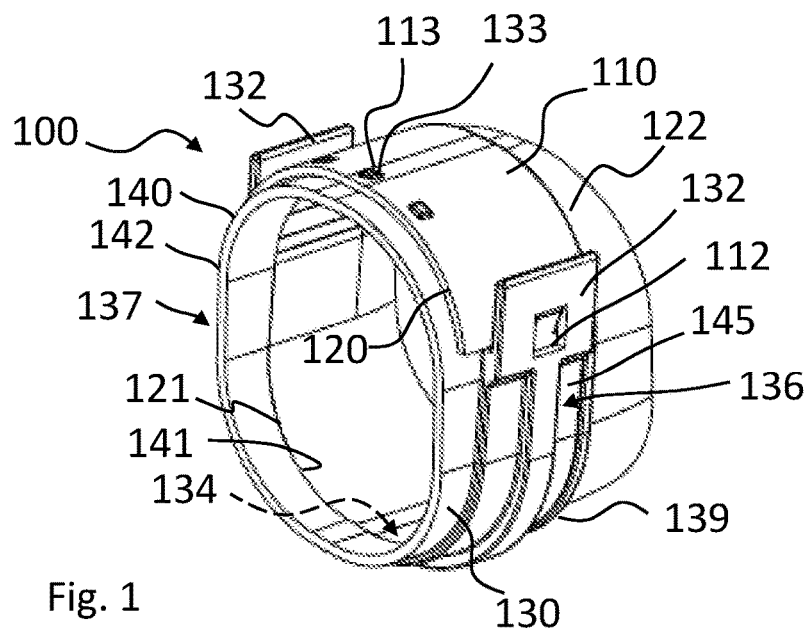
FIG. 1 an isometric view of a connection arrangement comprising a first and second connector according to a first embodiment of the invention where both connectors are manufactured by injection molding.
Figure 2:
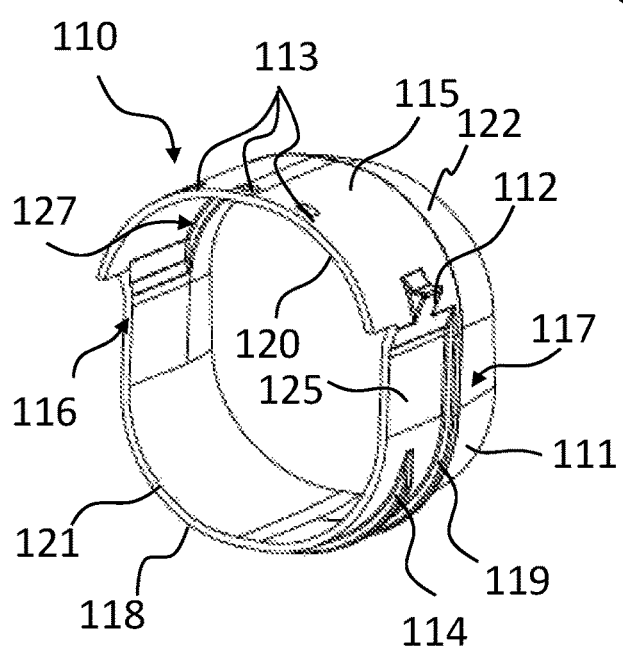
FIG. 2 an isometric view of the first connector of the connection arrangement shown in FIG. 1.
Figure 3:
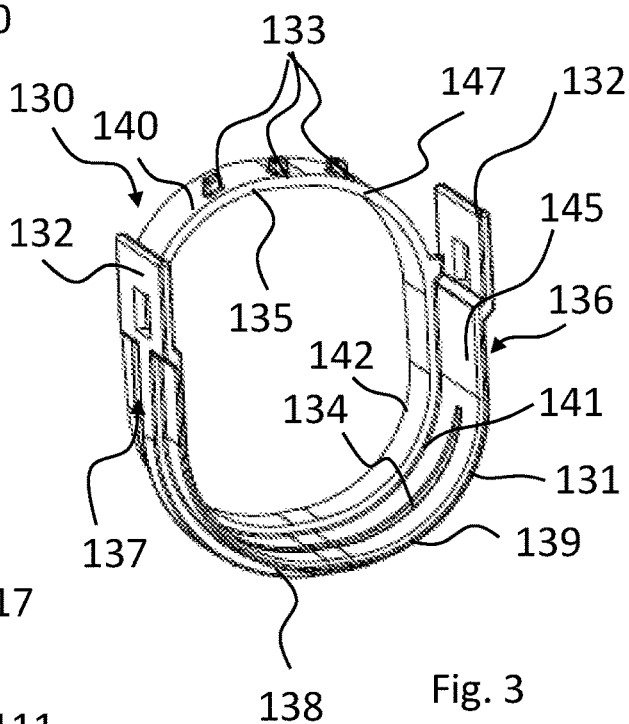
FIG. 3 an isometric view of the second connector of the connection arrangement shown in FIG. 1.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

FIGS. 1 to 8 illustrate a first embodiment of the invention. FIG. 1 shows an isometric view of a connection arrangement 100 comprising a first connector 110 and a second connector 130 according to a first embodiment of the invention. Both connectors 110, 130 are manufactured by injection molding. The other FIGS. 2 to 8 show various views of the connectors 110, 130 and the connection arrangement 100.

The connector arrangement 100 may be used as an air duct of a combustion engine, in particular of a vehicle, connecting a first tube 102 and a second tube 104 of the air duct.

The connector arrangement 100 is intended for connecting a first tube 102 and a second tube 104 in a detachable manner. The tubes 102, 104 are indicated schematically in FIGS. 6 and 8 as butts extending on both sides of the connector arrangement 100. The connectors 110, 130 may be formed integrally with the tubes 102, 104 or attached to the tubes 102, 104, e.g. by welding, clamping or the like.

The first connector 110 and the second connector 130 both have a closed circumference and show a generally oval-like cross section with rounded circumferential portions 115, 118 connected by linear portions 116, 117 in the first connector 110 and rounded circumferential portions 135, 138 connected by linear portions 136, 137 in the second connector 130. The linear portions 116, 117 and 136, 137 act as mutual guiding surfaces of the connectors 110, 130 when the connection arrangement 100 is assembled.

The first connector 110 comprises a body 111 displaying openings 113 in the rounded first circumferential portion 115 and a protrusion 114 arranged at the rounded second circumferential portion 118 of the body 111 opposite the first circumferential portion 115. The openings 113 are located in a segment 120 of the first circumferential portion 115 which projects in axial direction of the first connector 110. The openings 113 are intended to cooperate with corresponding pins 133 arranged at the first circumferential portion 135 of the second connector 130. The pins 133 and openings 113 are mutually form fitting elements for locking the first and second connectors 110, 130 in an axial direction.

A ring segment 122 is projecting in the opposite axial direction for attaching the first tube 102. Alternatively, the ring segment 122 may be a part of the first tube 102.

Although three openings 113 are shown it is to be understood that the number of openings 113 may vary from one to any convenient number of openings 113.

On the interior surface of the first circumferential portion 115 a step 127 is arranged. The wall portion 125 of the body 111 between its end face 121 and the step 127 is intended to cooperate with a segment 145 of the second connector 130. The wall portion 125 comprises the rounded second circumferential portion 118 and the two linear portions 116, 117.

Opposing the first circumferential portion 115 the second circumferential portion 118 is arranged which has a protrusion 114 in the wall portion of the body 111 between its end face 121 and the step 127 extending radially outside of the body 111. The protrusion 114 is intended to cooperate with a groove 134 of the second connector 130 extending in circumferential direction. The protrusion 114 and the groove 134 are mutually form fitting elements for locking the first and second connectors 110, 130 in an axial direction.

At the interfaces between the first circumferential portion 115 and the two adjoining linear portions 116, 117 of the wall portion 125 two notches 112 are arranged at the exterior surface of the first connector 110. The notches 112 are intended to cooperate with two corresponding clips 132 of the second connector 130. The clips 132 and the notches 112 are elements of a catch mechanism for locking the established connection of the first and second connectors 110, 130.

In an axial distance of the protrusion 114 a circumferential protrusion 119 is arranged which covers the circumferential direction of the wall portion 125. The protrusion 119 is intended to cooperate with an end face 139 of the second connector 130.

The body 131 of the second connector 130 comprises a segment 140 and an abutting segment 145 in axial direction, the segment 140 having a closed circumference and the segment 145 having a gap in its circumference. For establishing the connection between the two connectors 110, 130, wall portion 125 of the first connector 110 is inserted into the second connector 130 through the circumferential gap of the second connector 130. This is shown in more detail in FIG. 4.

The body 131 is displaying pins 133 in the rounded first circumferential portion 135 and a groove 134 arranged at the rounded second circumferential portion 138 of the body 131 opposite the first circumferential portion 135. The pins 133 are located in the closed segment 140 of the first circumferential portion 135. The pins 133 are intended to cooperate with the corresponding openings 113 arranged at the first circumferential portion 115 of the first connector 110. The pins 133 and openings 113 are mutually form fitting elements for locking the first and second connectors 110, 130 in an axial direction.

The groove 134 is intended to cooperate with the protrusion 114 in the wall portion 125 of the first connector 110.

A step 141 is provided at an interior surface of the body 131 projecting to an interior of the body 131. A front face 121 of the first connector 110 abuts against the step 141 when both connectors 110, 130 are fully connected to each other.

Figure 7:
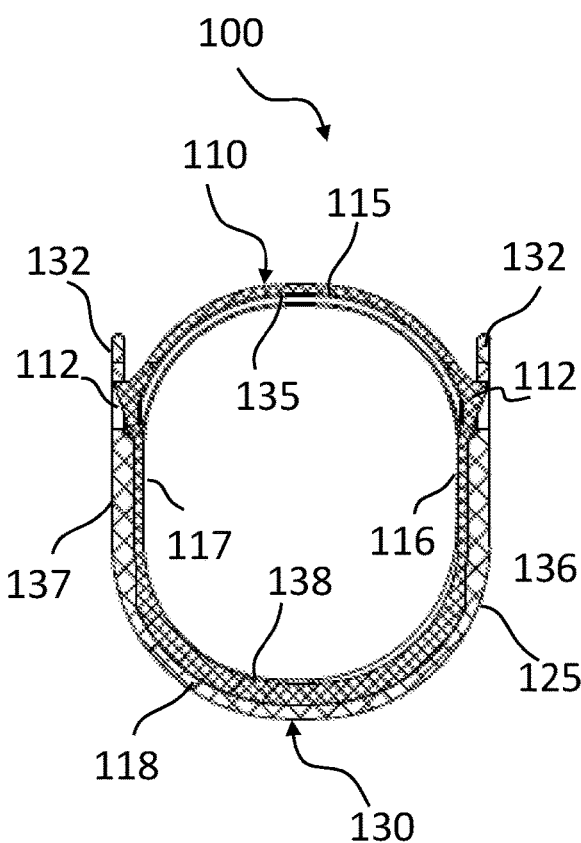
FIG. 7 a cross-sectional view of the connection arrangement shown in FIG. 1.
Figure 8:
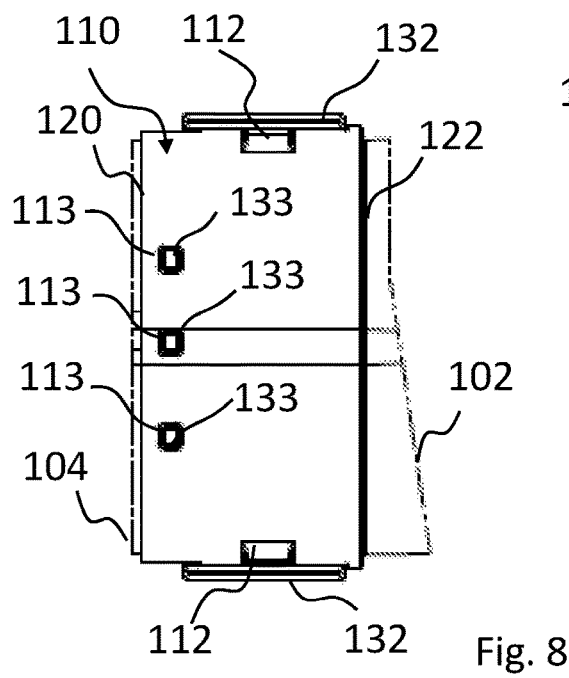
FIG. 8 a top view of the connection arrangement shown in FIG. 1.

For establishing the connection between the first and second connectors 110, 130, as shown in FIG. 7, the internal surface of the first circumferential portion 115 of the first connector 110 is arranged on the external surface of the first circumferential portion 135 of the second connector 130 and the external surface of the second circumferential portion 118 of the first connector 110 is arranged on the internal surface of the second circumferential portion 138 of the second connector 130.

Figure 4:
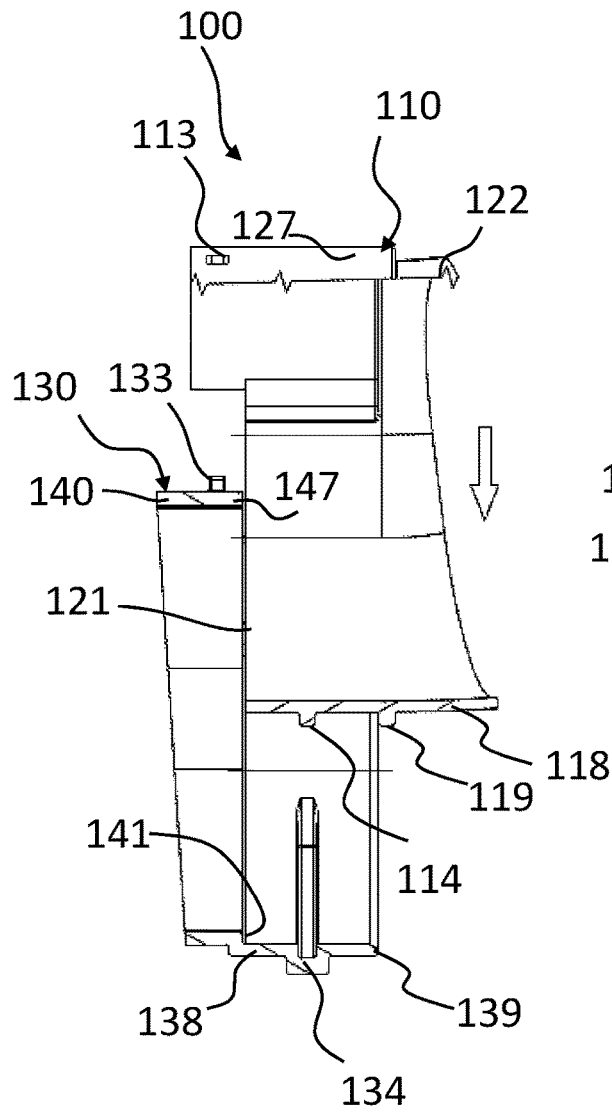
FIG. 4 a cut view of the connection arrangement shown in FIG. 1 in the process of establishing the connection.
Figure 5:
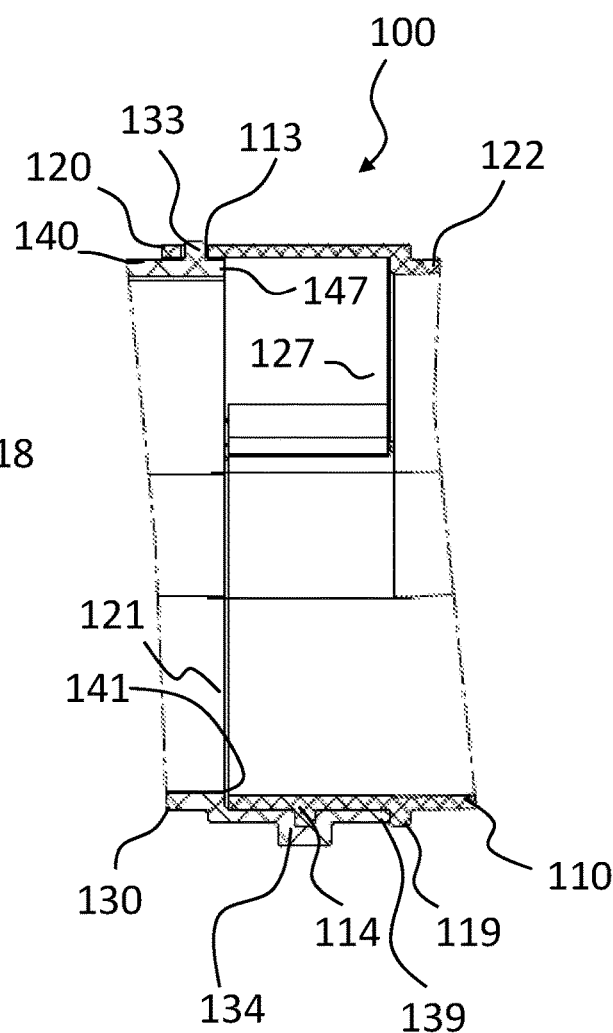
FIG. 5 a cut view of the connection arrangement shown in FIG. 1.
Figure 6:
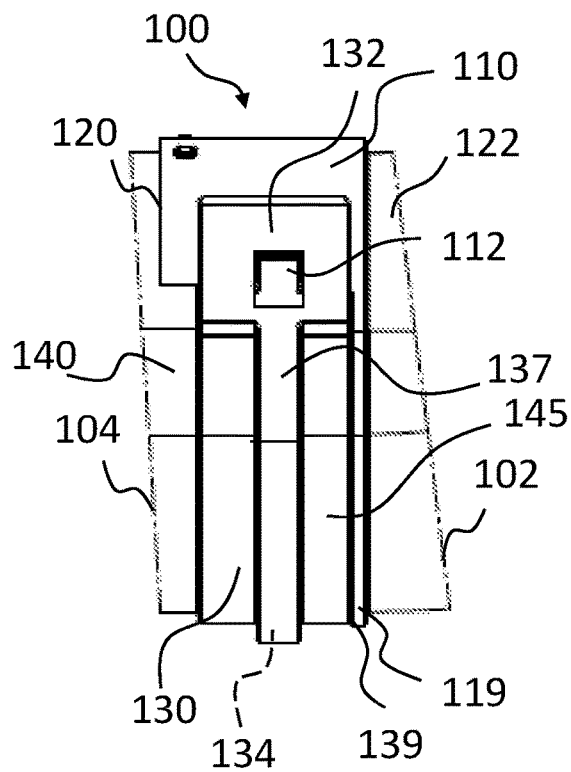
FIG. 6 a side view of the connection arrangement shown in FIG. 1.

As shown in FIG. 4 the first connector 110 is inserted with its wall portion 125 through the gap in the segment 145 of the second connector 130 in a direction perpendicular to the longitudinal axis of the connection arrangement 100. The perpendicular direction is indicated by a bold arrow in FIG. 4. When the wall portion 125 of the first connector 110 is fully inserted in the second connector 130, the pins 133 engage with the openings 113 and the projection 114 of the first connector 110 engages with the groove 134 of the second connector 130.

Simultaneously, the clips 132 of the second connector 130 slide over the notches 112 of the first connector 110 and lock the connection arrangement 100.

Due to the form fitting elements groove 134/protrusion 114 and pins 133/openings 113 the connection arrangement 100 is able to tolerate high pulling forces. For locking or opening the connection arrangement 100, the clips 132 and the notches 112 are used which are not subject to pulling forces in axial direction because of the form fitting elements 114, 134 and 113, 133. While pulling forces are more likely to act in longitudinal, axial direction, forces for locking the connection act perpendicular to the longitudinal direction of the connection arrangement 100. Thus the joint and locking functions are separate from each other.

In FIGS. 9 to 17 a second embodiment of the invention is illustrated in various views of a connection arrangement 100 and first and second connectors 110, 130, where FIG. 9 displays an isometric view of the connection arrangement 100 comprising a first connector 110 and second connector 130 according to another embodiment of the invention where the first connector 110 is manufactured by injection molding and the second connector 130 is manufactured by blow molding.

The connector arrangement 100 may be used as an air duct of a combustion engine, in particular of a vehicle, connecting a first tube 102 and a second tube 104 of the air duct.

The connector arrangement 100 is intended for connecting a first tube 102 and a second tube 104 in a detachable manner. The tubes 102, 104 are indicated schematically in FIGS. 15 and 17, for instance, as butts extending on both sides of the connector arrangement 100. The connectors 110, 130 may be formed integrally with the tubes 102, 104 or attached to the tubes 102, 104, e.g. by welding, clamping or the like.

The first connector 110 and the second connector 130 both have a closed circumference and show a generally oval-like cross section with rounded circumferential portions 115, 118 connected by linear portions 116, 117 in the first connector 110 and rounded circumferential portions 135, 138 connected by linear portions 136, 137 in the second connector 130. The linear portions 116, 117 and 136, 137 act as mutual guiding surfaces of the connectors 110, 130 when the connection arrangement 100 is assembled.

The first connector 110 comprises a body 111 displaying openings 113 in the rounded first circumferential portion 115 and a protrusion 114 arranged at the rounded second circumferential portion 118 of the body 111 opposite the first circumferential portion 115. The openings 113 are located in the first circumferential portion 115 of the first connector 110. The openings 113 are intended to cooperate with corresponding pins 133 arranged at the first circumferential portion 135 of the second connector 130. The pins 133 and openings 113 are mutually form fitting elements for locking the first and second connectors 110, 130 in an axial direction.

A ring segment 122 is projecting in the opposite axial direction for attaching the first tube 102. Alternatively, the ring segment 122 may be a part of the first tube 102.

Although one opening 113 is shown it is to be understood that the number of openings 113 may vary from one to any convenient number of openings 113.

On the interior surface of the first circumferential portion 115 a step 127 is arranged. The step 127 is intended to cooperate with an end face 147 of the second connector 130.

The wall portion 125 of the body 111 between its end face 121 and the step 127 is intended to cooperate with a segment 145 of the second connector 130. The wall portion 125 comprises the rounded second circumferential portion 118 and the two linear portions 116, 117.

Opposing the first circumferential portion 115 the second circumferential portion 118 is arranged which has a protrusion 114 in the wall portion of the body 111 between its end face 121 and the step 127 extending radially outside of the body 111. The protrusion 114 is intended to cooperate with a groove 134 of the second connector 130 extending in circumferential direction. The protrusion 114 and the groove 134 are mutually form fitting elements for locking the first and second connectors 110, 130 in an axial direction.

At the interfaces between the first circumferential portion 115 and the two adjoining linear portions 116, 117 of the wall portion 125 two notches 112 are arranged at the exterior surface of the first connector 110. The notches 112 are intended to cooperate with two corresponding clips 132 of the second connector 130. The clips 132 and the notches 112 are elements of a catch mechanism for locking the established connection of the first and second connectors 110, 130.

In an axial distance of the protrusion 114 a circumferential protrusion 119 is arranged on the wall portion 125 which spans the circumferential extension of the wall portion 125.

The protrusion 119 is intended to cooperate with an end face 139 of the second connector 130.

The body 131 of the second connector 130 comprises a segment 140 and an abutting segment 145 in axial direction, the segment 140 having a closed circumference and the segment 145 having a gap in its circumference. For establishing the connection between the two connectors 110, 130, wall portion 125 of the first connector 110 is inserted into the second connector 130 through the circumferential gap of the second connector 130. This is shown in more detail in FIGS. 12 and 13.

The body 131 displays a pin 133 in the rounded first circumferential portion 135 and a groove 134 arranged at the rounded second circumferential portion 138 of the body 131 opposite the first circumferential portion 135. The pin 133 is located in the closed segment 140 of the first circumferential portion 135. The pin 133 is intended to cooperate with the corresponding opening 113 arranged at the first circumferential portion 115 of the first connector 110. The pins 133 and openings 113 are mutually form fitting elements for locking the first and second connectors 110, 130 in an axial direction.

The groove 134 is intended to cooperate with the protrusion 114 in the wall portion 125 of the first connector 110.

The first circumferential portion 135 of the second connector 130 is provided with a ridge 144 on its exterior surface. The pin 133 is arranged between the ridge 144 and the end face 147 of the first circumferential portion 135. The ridge 144 is intended to cooperate with an end face 124 of the first connector 110. When properly mounted, the end face 124 of the first circumferential portion 115 of the first connector 110 adjoins the ridge 144 of the first circumferential portion 135 of the second connector 130.

A step 141 is provided at an interior surface of the body 131 projecting to an interior of the body 131. A front face 121 of the first connector 110 abuts against the step 141 when both connectors 110, 130 are fully connected to each other.

Figure 16:
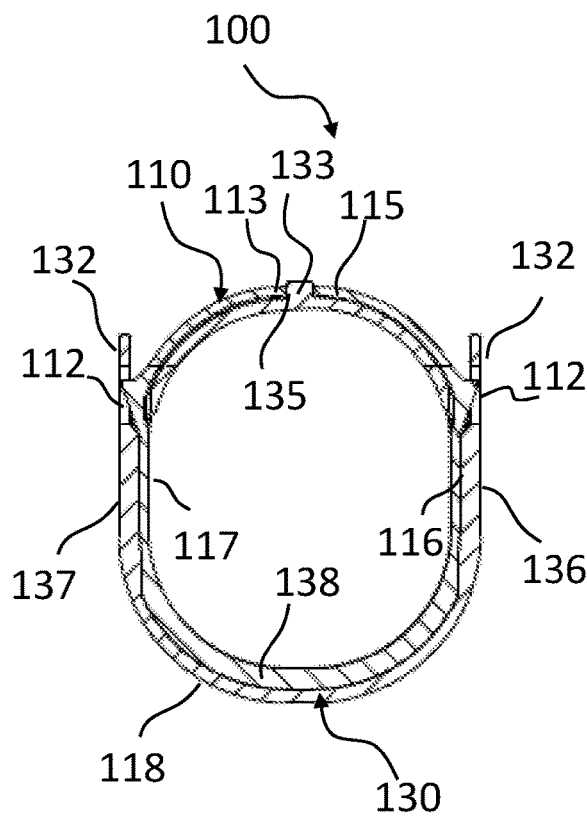
FIG. 16 a cross-sectional view of the connection arrangement shown in FIG. 9.
Figure 17:
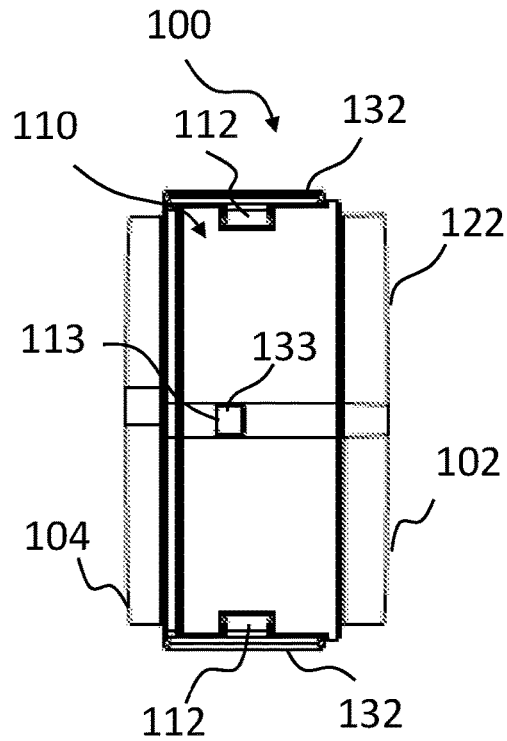
FIG. 17 a top view of the connection arrangement shown in FIG. 9.

For establishing the connection between the first and second connectors 110, 130, as shown in FIG. 16, the internal surface of the first circumferential portion 115 of the first connector 110 is arranged on the external surface of the first circumferential portion 135 of the second connector 130 and the external surface of the second circumferential portion 118 of the first connector 110 is arranged on the internal surface of the second circumferential portion 138 of the second connector 130.

Figure 12:
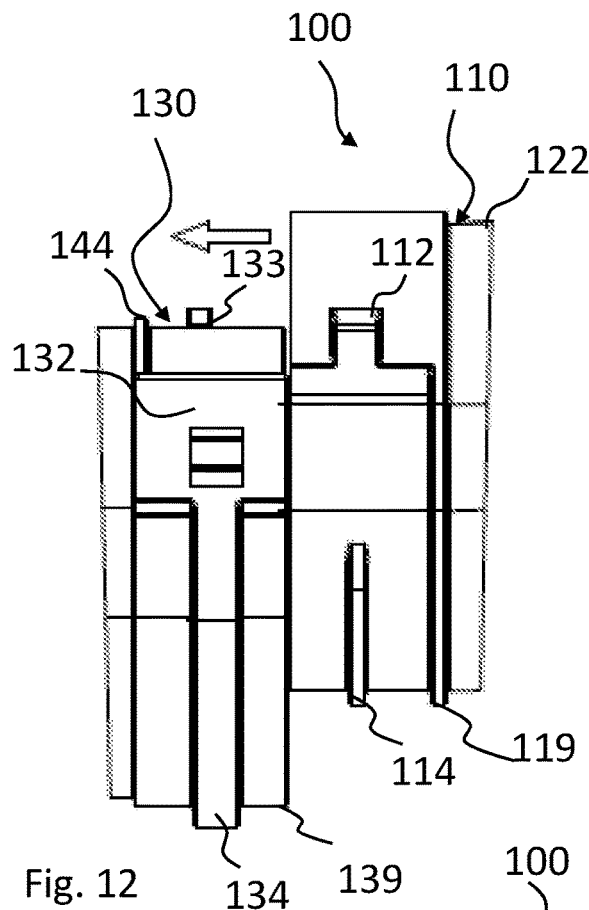
FIG. 12 a cut view of the connection arrangement shown in FIG. 9 of a first step in the process of establishing the connection.
Figure 13:
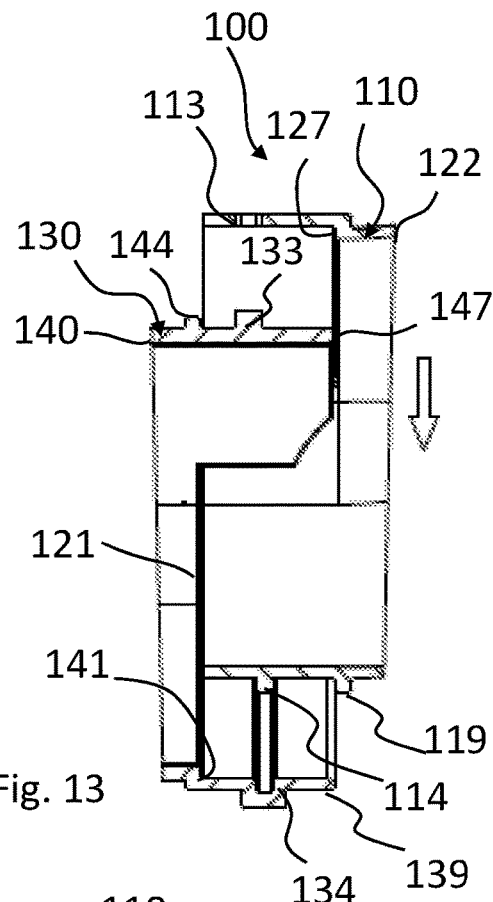
FIG. 13 a cut view of the connection arrangement shown in FIG. 9 of a second step in the process of establishing the connection.
Figure 14:
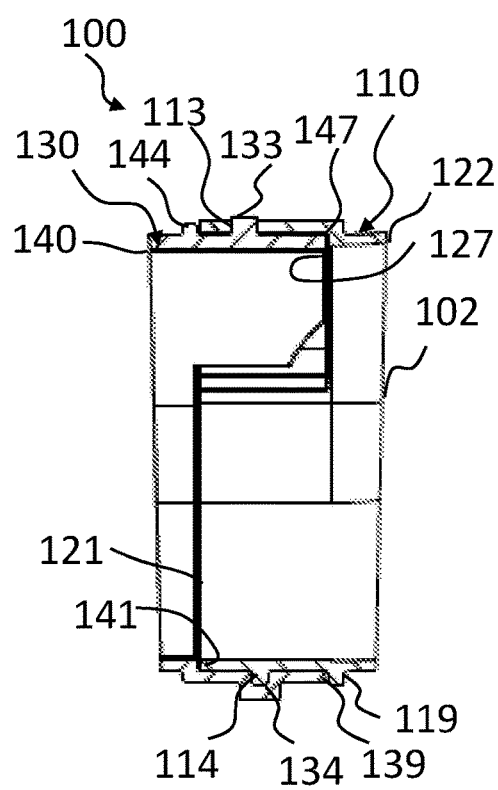
FIG. 14 a cross-sectional view of the connection arrangement shown in FIG. 9.
Figure 15:
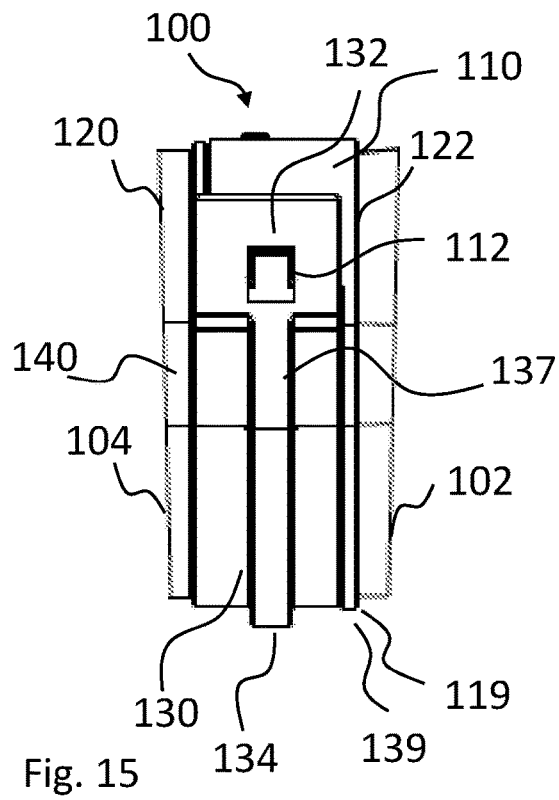
FIG. 15 a top view of the connection arrangement shown in FIG. 9.

As shown in FIGS. 12 and 13 the first connector 110 is inserted with its wall portion 125 through the gap in the segment 145 of the second connector 130 in a direction perpendicular to the longitudinal axis of the connection arrangement 100.

In a first step, the connectors 110, 130 are moved together in axial direction (FIG. 12) in order to allow the wall portion 125 of the first connector 110 entering the second connector 130 and in a second step in a crosswise direction (FIG. 13) for allowing engagement of protrusion 114 and corresponding groove 134 and pin 133 and corresponding opening 113.

The axial and crosswise directions are indicated by bold arrows in FIGS. 12 and 13. When the wall portion 125 of the first connector 110 is fully inserted in the second connector 130, the pin 133 engages with the opening 113 and the projection 114 of the first connector 110 engages with the groove 134 of the second connector 130. The movement combines an axial movement and a movement perpendicular to the axial direction.

Simultaneously, the clips 132 of the second connector 130 slide over the notches 112 of the first connector 110 and lock the connection arrangement 100.

Due to the form fitting elements groove 134/protrusion 114 and pin 133/opening 113 the connection arrangement 100 is able to tolerate high pulling forces. For locking or opening the connection arrangement 100, the clips 132 and the notches 112 are used which are not subject to pulling forces in axial direction because of the form fitting elements 114, 134 and 113, 133. While pulling forces are more likely to act in longitudinal, axial direction, forces for locking the connection act perpendicular to the longitudinal direction of the connection arrangement 100. Thus the joint and locking functions are separate from each other.

What is claimed is:

1. A connector arrangement for connecting a first tube and a second tube of a fluid duct in a detachable manner, comprising
    a first connector; and
    a second connector,
    wherein both connectors have a closed circumference,
    wherein for establishing a connection between the first and second connectors
        an internal surface of a first circumferential portion of the first connector is arranged on an external surface of a first circumferential portion of the second connector;
        an external surface of a second circumferential portion of the first connector is arranged on an internal surface of a second circumferential portion of the second connector
    wherein one or both of the connectors have:
        a body having one or more openings in a first circumferential portion, and one or more protrusions arranged at a circumferential portion of the body opposite the first circumferential portion.

2. The connector arrangement according to claim 1, wherein
    the first and second connectors comprise
        one or more elements of a locking mechanism configured to lock the established connection of the first and second connectors.

3. The connector arrangement according to claim 1, wherein
    the first and second circumferential portions of the first connector, and/or
    the first and second circumferential portions of the second connector
    comprise one or more mutually form fitting elements for locking the first and second connectors in an axial direction.

4. The connector arrangement according to claim 1, wherein
    the interior surfaces of the first and second connectors comprise
        one or more steps which cooperate with one or more corresponding edges and/or end faces for locking the first and second connectors in axial direction.

5. The connector arrangement according to claim 1, wherein
    at least one of the first and second connectors comprises
        a guiding portion for mutually guiding the first and second connectors in a direction generally perpendicular to an axial direction when establishing the connection.

6. The connector arrangement according to claim 1, wherein
    the second connector comprises
        a first segment with a closed circumference and
        a second segment having a gap in a circumference of the second segment.

7. The connector arrangement according to claim 1, wherein
    one or both of the connectors are integrally formed with a tube.

8. The connector arrangement according to claim 1, wherein
    one or both of the connectors are attached to a tube.

9. An air duct comprising:
a first tube;
a second tube; and
a connector arrangement according to claim 1, connecting the first tube to the second tube of the air duct.

10. The connector according to claim 1, wherein one or more steps are provided at an interior surface of the body.

11. The connector according to claim 1, wherein one or more notches are provided at an external surface of the body.

12. A connector for the connector arrangement for connecting the first tube to the second tube according to claim 1, comprising:
a body having:
one or more pins in a first circumferential portion; and
one or more circumferential grooves arranged in a circumferential portion of the body opposite the first circumferential portion.

13. The connector according to claim 12, wherein one or more steps are provided at an interior surface of the body projecting to an interior of the body.

14. The connector according to claim 13, wherein one or more clips are provided at an external surface of the body.

15. A connector arrangement for connecting a first tube and a second tube of a fluid duct in a detachable manner, comprising
a first connector; and
a second connector,
wherein both connectors have a closed circumference,
wherein for establishing a connection between the first and second connectors
an internal surface of a first circumferential portion of the first connector is arranged on an external surface of a first circumferential portion of the second connector;
an external surface of a second circumferential portion of the first connector is arranged on an internal surface of a second circumferential portion of the second connector
wherein one or both of the connectors have:
a body having one or more pins in a first circumferential portion, and one or more circumferential grooves arranged in a circumferential portion of the body opposite the first circumferential portion.

* * * * *